United States Patent
Sato et al.

(10) Patent No.: US 11,061,139 B2
(45) Date of Patent: Jul. 13, 2021

(54) RANGING SENSOR

(71) Applicant: SHARP KABUSHIKI KAISHA, Sakai (JP)

(72) Inventors: Hideki Sato, Sakai (JP); Takuma Hiramatsu, Sakai (JP); Takayuki Shimizu, Sakai (JP); Yoshiki Ikuta, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/926,498

(22) Filed: Jul. 10, 2020

(65) Prior Publication Data
US 2021/0018628 A1  Jan. 21, 2021

(30) Foreign Application Priority Data
Jul. 16, 2019  (JP) .............................. JP2019-131168

(51) Int. Cl.
| G01S 17/66 | (2006.01) |
| G01S 7/481 | (2006.01) |
| G01S 7/484 | (2006.01) |
| G01S 7/4863 | (2020.01) |
| G01S 17/86 | (2020.01) |

(52) U.S. Cl.
CPC .............. *G01S 17/66* (2013.01); *G01S 7/484* (2013.01); *G01S 7/4815* (2013.01); *G01S 7/4863* (2013.01); *G01S 17/86* (2020.01)

(58) Field of Classification Search
CPC ...... G01S 7/4876; G01S 7/487; G01S 17/931; G01S 7/4815; G01S 17/42; G01S 7/4863; G01S 7/4868
See application file for complete search history.

(56) References Cited

U.S. PATENT DOCUMENTS

| 2018/0113200 A1* | 4/2018 | Steinberg ................. G08G 1/04 |
| 2019/0146071 A1* | 5/2019 | Donovan .............. G01S 7/4876 |
| | | 356/5.01 |
| 2020/0057151 A1* | 2/2020 | Finkelstein ........... G01S 17/894 |

FOREIGN PATENT DOCUMENTS

| JP | 2017-173258 A | 9/2017 |
| JP | 2018-156408 A | 10/2018 |

* cited by examiner

*Primary Examiner* — Luke D Ratcliffe
(74) *Attorney, Agent, or Firm* — ScienBiziP, P.C.

(57) ABSTRACT

A ranging sensor includes a light emitting unit includes a plurality of light emitting elements, a light receiving unit including a plurality of light receiving elements, a space control unit, a position estimation unit, and a TOF signal processing unit, operates in cooperation with an RGB camera module, and generates target distance information for generating three-dimensional position information. The space control unit independently controls each element group including a light emitting element and a light receiving element allocated to a common subspace. The position estimation unit estimates, from received light amount distribution of a plurality of light receiving elements receiving a reflected light beam from the target existing in a space of each subspace, a position of the target in the space of the subspace group. The TOF signal processing unit performs TOF signal processing in parallel with channels whose number is less than that of light emitting elements.

11 Claims, 9 Drawing Sheets

| 1:HOST SYSTEM | 24:POSITION ESTIMATION UNIT | 202:LIGHT EMITTING LENS SYSTEM |
| 2:TOF RANGING SENSOR | 25:TOF SIGNAL PROCESSING UNIT | 203:LIGHT EMITTING ELEMENT |
| 3:RGB CAMERA MODULE | 26:COMMUNICATION UNIT | 211:LIGHT RECEIVING ELEMENT ARRAY |
| 4:APPLICATION PROCESSOR | 29:REGISTER | 212:LIGHT RECEIVING LENS SYSTEM |
| 20:LIGHT EMITTING UNIT | 32:IMAGING LENS SYSTEM | 213:LIGHT RECEIVING ELEMENT |
| 21:LIGHT RECEIVING UNIT | 201:LIGHT EMITTING ELEMENT ARRAY | 311:IMAGING ELEMENT |
| 22:SPACE CONTROL UNIT | | |
| 23:LIGHT EMITTING ELEMENT DRIVING UNIT | | |

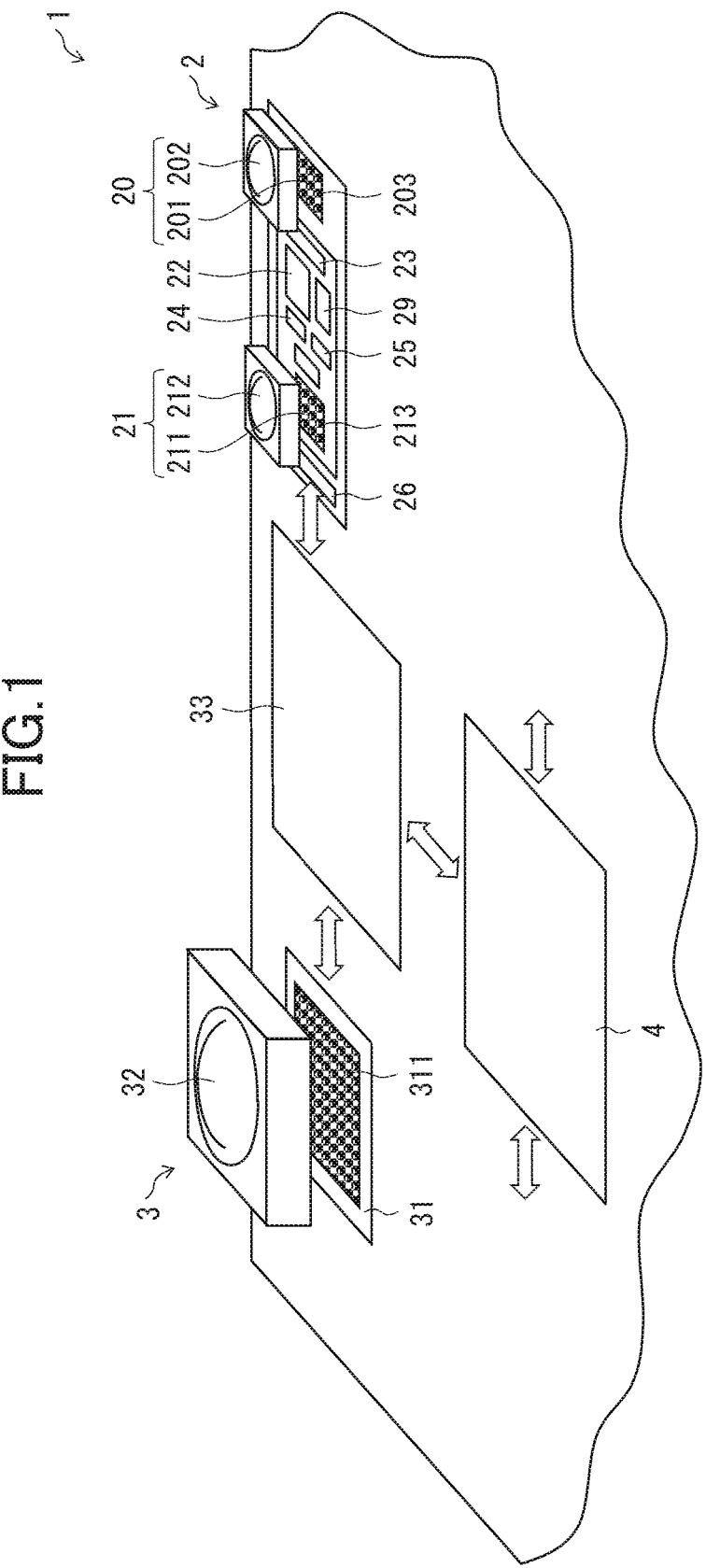

FIG.2

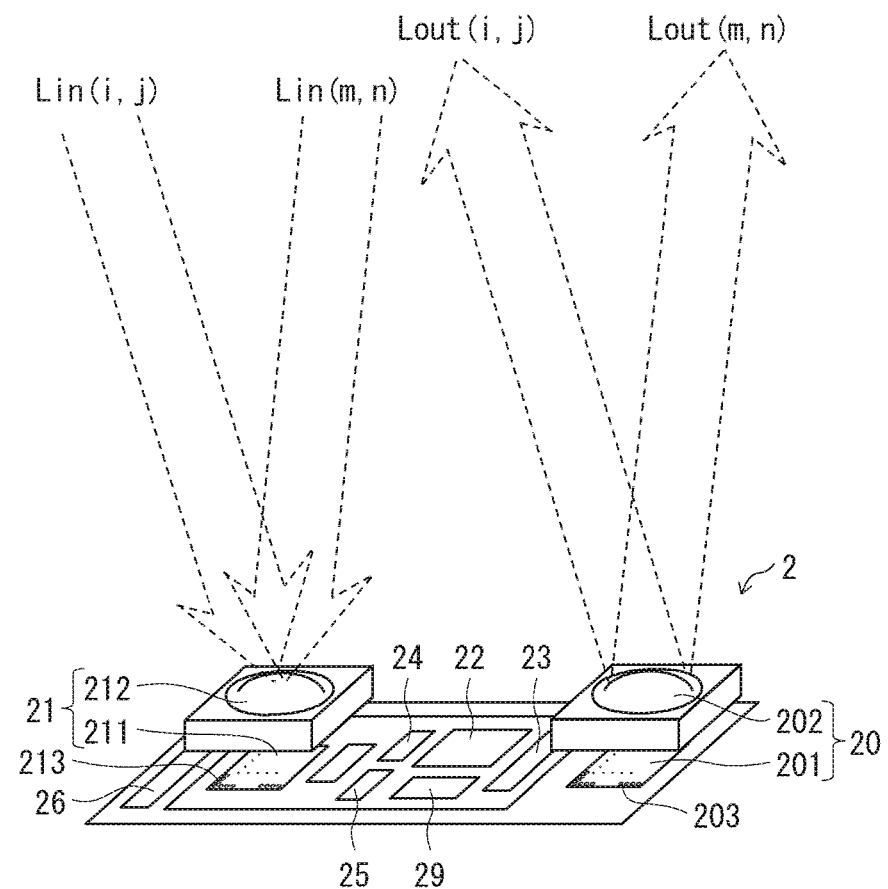

| | |
|---|---|
| 2: TOF RANGING SENSOR | 201: LIGHT EMITTING ELEMENT ARRAY |
| 20: LIGHT EMITTING UNIT | 202: LIGHT EMITTING LENS SYSTEM |
| 21: LIGHT RECEIVING UNIT | 203: LIGHT EMITTING ELEMENT |
| 22: SPACE CONTROL UNIT | 211: LIGHT RECEIVING ELEMENT ARRAY |
| 23: LIGHT EMITTING ELEMENT DRIVING UNIT | 212: LIGHT RECEIVING LENS SYSTEM |
| 24: POSITION ESTIMATION UNIT | 213: LIGHT RECEIVING ELEMENT |
| 25: TOF SIGNAL PROCESSING UNIT | Lout: LIGHT BEAM |
| 26: COMMUNICATION UNIT | Lin: REFLECTED LIGHT BEAM |
| 29: REGISTER | |

213: LIGHT RECEIVING ELEMENT
dsg1: FIRST SUBSPACE GROUP
R: REFLECTED LIGHT BEAM COMPONENT OF DETECTION TARGET

FIG.8

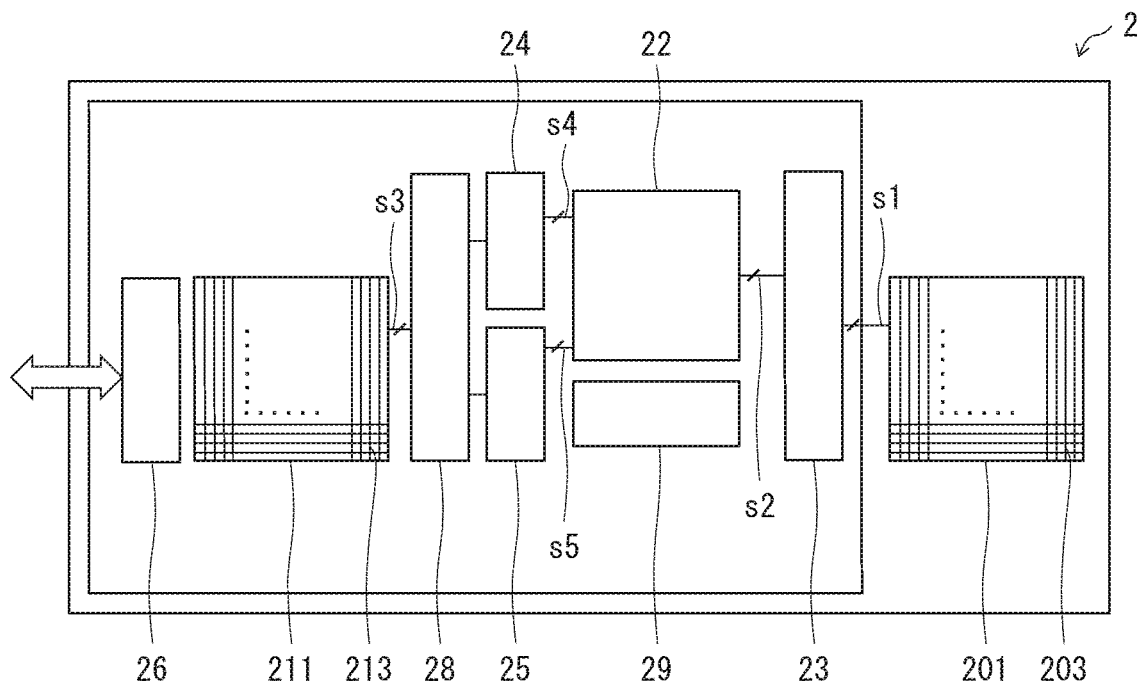

2: TOF RANGING SENSOR
22: SPACE CONTROL UNIT
23: LIGHT EMITTING ELEMENT
    DRIVING UNIT
24: POSITION ESTIMATION UNIT
25: TOF SIGNAL PROCESSING UNIT
26: COMMUNICATION UNIT
28: SELECTOR
29: REGISTER
201: LIGHT EMITTING ELEMENT
    ARRAY
203: LIGHT EMITTING ELEMENT
211: LIGHT RECEIVING ELEMENT
    ARRAY
213: LIGHT RECEIVING ELEMENT
s1: DRIVE SIGNAL
s2: CONTROL SIGNAL
s3: OUTPUT SIGNAL
s4: CONTROL SIGNAL
s5: CONTROL SIGNAL

RANGING SENSOR

CROSS-REFERENCE TO RELATED APPLICATION

The present application claims priority from Japanese Application JP 2019-131168, the content to which is hereby incorporated by reference into this application.

BACKGROUND OF THE INVENTION

1. Field of the Invention

The present disclosure relates to a ranging sensor that measures a distance to a target.

2. Description of the Related Art

Various depth cameras and three-dimensional cameras that enable three-dimensional mapping by adding depth information to a two-dimensional image have been recently proposed. Examples of a depth camera or three-dimensional camera system based on a general RGB camera include one that performs stereo matching on the basis of parallax of two cameras to thereby extract a target, and then performs an inverse operation to a distance map. Another example of a depth camera or three-dimensional camera system is one that performs an inverse operation to obtain a distance map on the basis of distortion of an image obtained by observing, by one camera, pattern light (Structured Light) projected on a target. Still another example of a depth camera or three-dimensional camera system is a TOF (Time of Flight) imager (TOF camera), which calculates a distance on the basis of a delay amount of a reflected light beam of a light pulse radiated to a target.

In a case where information about a distance to a specific target that moves on a two-dimensional image is desired to be acquired in the depth camera or three-dimensional camera described above, it is requested to track the target. As such an apparatus that measures a distance to a moving target, for example, Japanese Unexamined Patent Application Publication No. 2017-173258 describes a distance measurement apparatus that drives an MEMS (Micro Electro Mechanical System) mirror to thereby perform two-dimensional scanning with a projector unit that emits a laser light beam. Moreover, Japanese Unexamined Patent Application Publication No. 2018-156408 describes an image recognizing and capturing apparatus that acquires depth information (full-depth map) of all angles of view and then combines the resultant with a two-dimensional image.

SUMMARY OF THE INVENTION

The following problems arise when the aforementioned technique of tracking a specific moving target existing on a two-dimensional image is developed to a mobile device such as a smartphone. Specifically, the technique using the MEMS mirror in Japanese Unexamined Patent Application Publication No. 2017-173258 has a problem of being not suitable to be used for a mobile device due to limitation of a size. In a case where the full-depth map is generated in the three-dimensional camera system based on an operation with use of an RGB camera in Japanese Unexamined Patent Application Publication No. 2018-156408, there is a problem that operation cost is high.

On the other hand, in a three-dimensional camera system using a pattern light method, an infrared light beam is used as irradiation light so as not to affect an RGB camera and a dedicated high pixel infrared imager is used. Even in a case where the TOF camera is used, light irradiation to an entire space is indispensable and the depth map is requested to be updated with a general video frame rate (30 fps or 60 fps), thus increasing power consumption.

Further, though reduction in size and power consumption of the three-dimensional camera system is progressed with an optical projection technique by the MEMS mirror, it is still difficult to cope with a high speed frame rate, and there is also a problem that an entire system is complicated so that it is difficult to avoid an increase in cost due to an increase in the number of components.

An aspect of the disclosure is made in view of the series of problems described above, and a ranging sensor using a TOF method, which operates in cooperation with a camera module mounted on a mobile device, is capable of measuring a distance to a moving target while performing two-dimensional tracking, and achieves both reduction in power consumption and reduction in size and cost, is provided.

A ranging sensor according to an aspect of the disclosure is a ranging sensor using a TOF method, which operates in cooperation with a camera module, measures time during which a beam radiated to a space is reflected by a target and returned, and generates distance information of the target for generating three-dimensional position information by combining the distance information with image information acquired by the camera module. The ranging sensor includes: a light emitting unit that includes a plurality of light emitting elements arrayed in plane and radiates, toward subspaces obtained by dividing the space, light beams from the light emitting elements allocated to the respective subspaces by forming a beam by a light emitting lens system; a light receiving unit that includes a plurality of light receiving elements arrayed in plane, and receives reflected light beams from the respective subspaces by forming images of the reflected light beams on the light receiving elements, which are allocated, by a light receiving lens system; a space control unit that independently controls each element group including a light emitting element and a light receiving element, which are allocated to a common one of the subspaces, and that sets at least one subspace group that is designated in advance on a basis of the image information and obtained by bundling a plurality of adjacent subspaces; a position estimation unit that estimates, on a basis of received light amount distribution of the plurality of light receiving elements that receive a reflected light beam from the target existing in a space of each subspace in the at least one subspace group set by the space control unit, a position of the target in the space of the subspace group; and a TOF signal processing unit that performs TOF signal processing in parallel with channels whose number is less than the number of the light emitting elements and acquires the distance information whose number is equal to or less than the number of channels.

BRIEF DESCRIPTION OF THE DRAWINGS

FIG. 1 is a perspective view illustrating a schematic configuration of a host system according to Embodiment 1 of the disclosure;

FIG. 2 illustrates a state of an operation of a TOF ranging sensor in FIG. 1;

FIG. 8 is a plan view illustrating a circuit block configuration of the TOF ranging sensor in FIG. 1;

DETAILED DESCRIPTION OF THE INVENTION

Embodiment 1

Figure 3:
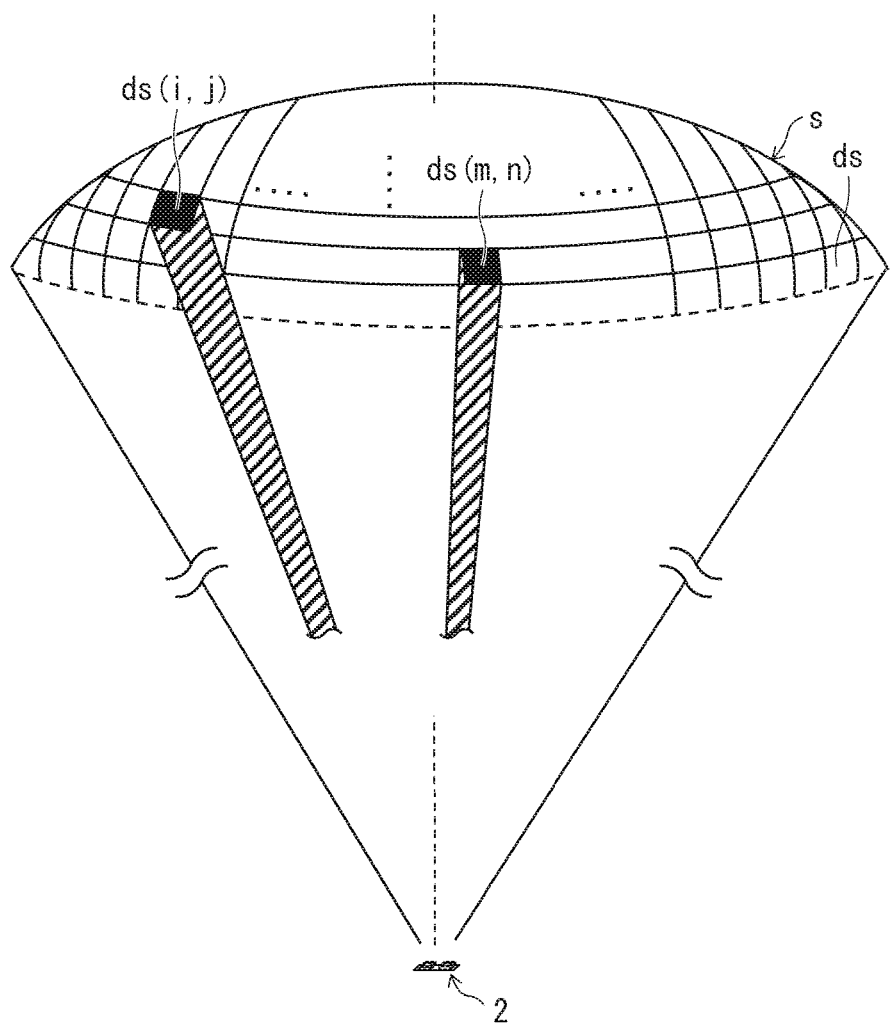
FIG. 3 illustrates a state of space division of the TOF ranging sensor in FIG. 1.

Embodiment 1 of the disclosure will be described below with reference to FIGS. 1 to 8. In Embodiment 1, an example of applying a ranging sensor to a three-dimensional camera system will be described.

[Outline of Three-Dimensional Camera System]

First, an outline of the three-dimensional camera system in Embodiment 1 will be described with reference to FIG. 1. FIG. 1 is a perspective view illustrating a schematic configuration of a host system according to Embodiment 1. A host system 1 illustrated in FIG. 1 is a three-dimensional camera system mounted on a mobile device (mobile terminal), for example, such as a smartphone, smart glasses, a head-mounted display, or a device of a development type thereof.

The host system 1 includes a TOF ranging sensor (ranging sensor) 2 and an RGB camera module (camera module) 3. The host system 1 adds depth information as distance information of a target (target to be measured), which is generated by the TOF ranging sensor 2, to two-dimensional imaging data (image information) of the target imaged by the RGB camera module 3 and thereby generates a three-dimensional image (three-dimensional position information).

The TOF ranging sensor 2 is a ranging sensor using a TOF (Time of Flight) method, which is operable in cooperation with the RGB camera module 3 via a communication unit 26. The TOF ranging sensor 2 receives a reflected light beam that is reflected by a target that exists in a space (irradiation space) irradiated with an irradiation light beam (usually, pulse light beam) and detects flight time (delay time) of the light beam to thereby measure a distance from the TOF ranging sensor 2 to the target.

The RGB camera module 3 is a standard camera module mounted on a mobile device. The RGB camera module 3 includes an APS (Active Pixel Sensor) 31 in which a plurality of imaging elements (pixels) 311 are arrayed in plane (in matrix), an imaging lens system 32, an ISP (Image Signal Processor) 33, and the like. As the RGB camera module 3, various configurations such as a configuration in which the APS 31 and the imaging lens system 32 are mounted, a configuration in which the ISP 33 is also integrated in addition to the APS 31 and the imaging lens system 32, and a configuration in which the APS 31 and the ISP 33 are made in a CSP (Chip Size Package) are able to be used. An entire image processing system including the TOF ranging sensor 2 and the RGB camera module 3 described above functions as the three-dimensional camera system.

In the mobile device, a device such as the RGB camera module 3 or a display (not illustrated) is generally interfaced with an application processor 4 in conformity with the MIPI standard. Similarly, the TOF ranging sensor 2 may be also directly interfaced with the application processor 4. Alternatively, there may be a case where the TOF ranging sensor 2 is connected to the application processor 4 via a dedicated processor (not illustrated) for generating a three-dimensional image. In this case, the APS 31 and the ISP 33 in the RGB camera module 3 and the TOF ranging sensor 2 are all connected to the dedicated processor and mutually interfaced.

Moreover, a size of output data of the TOF ranging sensor 2 is smaller than that of output data of the RGB camera module 3, so that the TOF ranging sensor 2 may be connected to the ISP 33, the dedicated processor, or the application processor 4 in conformity with a general serial communication standard such as I2C, I3C, or SPI. In any case, it is only requested that the TOF ranging sensor 2 is able to cooperate with an image processing system of the RGB camera module 3 through the communication unit 26.

[Detail of TOF Ranging Sensor]

Next, a configuration and an operation of the TOF ranging sensor 2 in Embodiment 1 will be described with reference to FIGS. 2 and 3. FIG. 2 illustrates a state of an operation of the TOF ranging sensor in FIG. 1. FIG. 3 illustrates a state of space division of the TOF ranging sensor in FIG. 1. As illustrated in FIGS. 2 and 3, the TOF ranging sensor 2 includes a light emitting unit 20, a light receiving unit 21, a space control unit 22, a light emitting element driving unit 23, a position estimation unit 24, a TOF signal processing unit 25, the communication unit 26, and the like.

(Configuration of TOF Ranging Sensor)

First, an example of the configuration of the TOF ranging sensor 2 will be described. The TOF ranging sensor 2 is obtained by applying a space division multiplex technique. In the TOF ranging sensor 2, as illustrated in FIGS. 2 and 3, the light emitting unit 20 radiates a light beam (beam) Lout to each of subspaces ds obtained by dividing a space s into a plurality of spaces. Then, upon reception of each reflected light beam Lin, which is reflected by any target and returned, with angular resolution, the TOF ranging sensor 2 outputs information about a distance to the target for each of the subspaces ds.

In FIG. 3, two subspaces ds(i, j) and ds(m, n) are illustrated as an example. In FIG. 2, light beams Lout(i, j) and Lout(m, n) and reflected light beams Lin(i, j) and Lin(m, n) that correspond to the two subspaces ds in FIG. 3 are illustrated as an example. That is, the light beam Lout(i, j) is a component of a light beam Lout radiated to the subspace ds(i, j). The reflected light beam Lin(i, j) is a component of a light beam Lout(i, j), which is reflected by a target existing in the subspace ds(i, j), in the light beam Lout(i, j). Similarly, the light beam Lout(m, n) is a component of a light beam Lout radiated to the subspace ds((m, n). The reflected light beam Lin(m, n) is a component of a light beam Lout(m, n), which is reflected by a target existing in the subspace ds((m, n), in the light beam Lout(m, n).

Here, subscripts (i, j) and (m, n) are natural numbers indicating order of the subspaces ds that are arranged in a two-dimensional lattice pattern in an angle region. As illustrated in FIGS. 2 and 3, when a subspace ds, a light beam Lout, or a reflected light beam Lin is to be distinguished as a specific one, subscripts (i, j) or (m, n) are given. On the other hand, when a subspace ds, a light beam Lout, or a reflected light beam Lin is not distinguished as a specific one and is expressed as a general one, no subscript is given. When a subspace ds, a light beam Lout, or a reflected light beam Lin is expressed as any one, subscripts (p, q) are given.

The light emitting unit 20 includes a light emitting element array 201 and a light emitting lens system 202. The light emitting element array 201 is one in which a plurality of light emitting elements 203 are arrayed in plane (in matrix) so as to cover an entirety of the space s by light beams Lout. In the light emitting element array 201, for example, 64×64=4096 light emitting elements 203 are arranged in a square, and 4096 or more light emitting elements 203 are arranged when a surplus element is also included. Each of the light emitting elements 203 is constituted by, for example, Vertical Cavity Surface Emitting Laser (VCSEL). Drive control of the light emitting elements 203 is able to be performed individually.

In the TOF ranging sensor 2, a light emitting element 203 is allocated correspondingly to each of the subspaces ds. That is, in the TOF ranging sensor 2, a Far Field Pattern (FFP) of each single light emitting element 203 is adjusted so that a desired emission angle characteristic for the light beam Lout from the light emitting element 203 allocated to each of the subspaces ds to the subspace ds through the light emitting lens system 202 is achieved. Moreover, a distance between a light emitting surface of the light emitting element array 201 and an image plane of the light emitting lens system 202 is adjusted to suppress occurrence of a gap (spatial region in which irradiation is not allowed) between adjacent subspaces. Further, by allowing each of the light emitting elements 203 to be individually turned ON/OFF in accordance with a definition of a subspace group described below, it is possible to independently irradiate each of the subspaces ds with a light beam while covering the entirety of the space s that is subjected to space division multiplexing.

The light receiving unit 21 includes a light receiving element array 211 and a light receiving lens system 212. The light receiving element array 211 is one in which a plurality of light receiving elements (pixels) 213 are arrayed in plane (in matrix). The light receiving element array 211 receives, with angular resolution, the reflected light beams Lin obtained when the light beams Lout radiated to the subspaces ds are reflected by the target and outputs information about a distance to the target for each of the subspaces ds.

In the light receiving element array 211 of Embodiment 1, for example, 64×64=4096 light receiving elements 213 are arranged in a square at the same pitch as that of the light emitting element array 201, and 4096 or more light receiving elements 213 are arranged when a surplus element is also included. Each of the light receiving elements 213 is constituted by, for example, a Single-Photon Avalanche Diode (SPAD) or the like. An output of each of the light receiving elements 213 is connected to a front end circuit (not illustrated) including at least a first stage gate such as an active quenching resistor or an inverter for each of the light receiving elements 213. A minimum configuration using the SPAD is an example of most desirable selection from a viewpoint of forming an integrated array and performing compact multipoint TOF measurement.

In the TOF ranging sensor 2, a light receiving element 213 is allocated correspondingly to each of the subspaces ds. That is, in the TOF ranging sensor 2, the reflected light beam Lin from each of the subspaces ds is received by a predetermined light receiving element 213 through the light receiving lens system 212. Moreover, a distance between a light receiving surface (light receiving element surface) of the light receiving element array 211 and an image plane of the light receiving lens system 212 is adjusted so that an image of the reflected light beam Lin from each of the subspaces ds is formed on each of the light receiving elements 213 so that occurrence of a gap (spatial region in which light reception is not allowed) between adjacent subspaces ds is suppressed. By the light receiving lens system 212 and the light receiving element array 211, a whole set of the subspaces ds covered by the light receiving elements 213 forms the space s.

The light receiving lens system 212 is a lens system that is designed by considering image plane distortion so that the light receiving element array 211 functions as a so-called FPA (Focal Plane Array). Note that, differently from an imaging lens system of a general camera, the light receiving lens system 212 is only requested to be optimally designed only for a wavelength band used for the light beam Lout and the reflected light beam Lin thereof and is not necessarily requested to have design of a high-grade lens that is formed by multiple groups. However, the light receiving lens system 212 is desired to be designed by taking other known techniques for realizing simple incorporation, low cost, and low height for mobile use.

An element size of each of the light emitting element array 201 and the light receiving element array 211 is 64×64 elements and shapes of the light emitting lens system 202 and the light receiving lens system 212 are almost the same. Further, a pitch between the light emitting elements 203 is set as the same as that of the light receiving elements 213, and design is performed to satisfy 64° which is an example of a general angle of view of a mobile camera (refer to FIG. 4). Accordingly, the TOF ranging sensor 2 has angular resolution of about 1° with respect to each of a subspace ds covered by each of the light emitting elements 203 and a subspace ds covered by each of the light receiving elements 213.

Here, it is indispensable to perform design so that the subspace ds covered by the light emitting element 203 and the subspace ds covered by the light receiving element 213 are common, that is, are spatially matched in a far field. This is because positions at which the light emitting unit 20 and the light receiving unit 21 are arranged are adjacent to each other on the same plane, but both of them are not able to be arranged at completely the same position. Therefore, angle deviation correction in consideration of position shift in advance is requested. Though this is a problem principally in mounting of a member in a manufacturing process of the TOF ranging sensor 2, it is generally possible to deal with the problem by performing so-called active alignment as described below.

For example, when the light receiving lens system 212 of the light receiving unit 21 is positioned and mounted after mounting of the light emitting unit 20 is completed and die bonding and wire bonding mounting of the light receiving elements 213 are completed so that a state where an electrical operation as a sensor is also enabled is provided, the light beam Lout from a specific light emitting element 203 is actually radiated to an external diffuse reflection plate, and a position of the light receiving lens system 212 is adjusted and fixed so that an amount of a reflected light beam to the specific light receiving element 213, on which the reflected light beam is to be originally incident correspondingly, becomes maximum. At this time, it is possible to secure requested accuracy by using ultraviolet curing resin or the like as an adhesive and curing the adhesive at appropriate timing.

Next, the space control unit 22 will be described. The space control unit 22 appropriately performs connection processing of each electrical signal. That is, the space control unit 22 individually controls connection to the light emitting element 203 and connection from the light receiving element 213 or the front end circuit. The connection control by the space control unit 22 forms an element group which includes the light emitting element 203 and the light receiving element 213 that are allocated to the aforementioned common subspace ds(p, q), so that light emission driving and received signal processing are able to be independently performed for each element group.

Specifically, the space control unit 22 forms, for example, at least one subspace group designated by the host system 1 and obtained by bundling a plurality of subspaces ds that are adjacent to each other. Then, by using a result of estimating a position of a target by the position estimation unit 24 described later, the space control unit 22 independently controls the driving and the signal processing for each element group in order to simultaneously perform TOF signal processing for the number of subspace groups that are formed.

The light emitting element driving unit 23 outputs a drive signal on the basis of a control signal from the space control unit 22. Specifically, the light emitting element driving unit 23 individually switches ON/OFF of driving of each of the light emitting elements 203 in accordance with the control signal from the space control unit 22. Here, a small number of adjacent light emitting element groups that are driven at completely the same timing with the same code form an aggregate (beam group) of a plurality of adjacent beams that emit light at the same timing with almost the same intensity, and act as a single beam source that irradiates a wider space.

On the basis of the control signal from the space control unit 22, output signals output from the respective light receiving elements 213 allocated to the plurality of subspaces ds that form the subspace group obtained by bundling the plurality of adjacent subspaces ds are input to front end circuits for each of the light receiving elements 213 and converted into digital signals. The output signals of the respective front end circuits of the light receiving elements 213 are input to counter circuits (not illustrated) each provided in the position estimation unit 24.

The counter circuits count the number of pulses included in the output signals of the respective front end circuits of the light receiving elements 213 during a period before a TOF measurement sequence of a measurement cycle, after being reset at a head of the measurement cycle or at an end of a measurement cycle immediately before the measurement cycle. In this manner, the counter circuits acquire light amount values that correspond to received light amounts of the light receiving elements 213 for each measurement cycle, before the TOF measurement sequence of the measurement cycle.

Subsequently, by comparing the light amount values of the respective subspaces ds, that is, count values by the counter circuits, the position estimation unit 24 estimates a position of a target in the subspace group obtained by bundling the plurality of adjacent subspaces ds. Here, when the counter circuits count dark count (state under only environment light, in which the light emitting unit 20 itself does not emit light at all) of the light receiving elements 213 separately from the light amount values corresponding to received light amount distribution of the light receiving elements 213, that is, separately from the count values and the dark count is subtracted from the light amount values (count values), influence of disturbance light is able to be reduced.

Note that, various methods of the TOF signal processing are well known and detailed description will not be given here. However, for the TOF signal processing, a signal processing circuit scale that facilitates performing processing of output signals from the light receiving elements 213 in parallel, that is, a signal processing method that is compact is desired.

(Operation of TOF Ranging Sensor)

Next, an example of an operation of the TOF ranging sensor 2 will be described. A detection angle range (transmission and reception viewing angle) of the TOF ranging sensor 2 in Embodiment 1 is ±32°, and each of the light emitting element array 201 and the light receiving element array 211 is designed so that at least 64×64 effective element regions are squarely arrayed at equal pitches and there is no dead region. Angular resolution of each element (pixel) of the focal plane array is about 1°.

Since each of the light receiving elements (each of the pixels) 213 of the light receiving element array 211 is connected to the front end circuit, a fill factor of a part that purely contributes to light reception on the light receiving surface of the light receiving element array 211 may be lowered. In this case, by using a well-known technique, for example, by densely forming micro lenses on the light receiving surface that includes the front end circuit and making an optical fill factor close to 1, it is possible to achieve the angular resolution described above.

Minimum angular resolution of about 1° that is defined as described above corresponds to an image height of about 1.8 cm at a distance of 1 m in a real space. Therefore, granularity that is practically sufficient for three-dimensional mapping accuracy in a case of use for a mobile device is able to be achieved. Here, in the present embodiment, it is not assumed that TOF measurement of an entire viewing angle is performed at all times with the minimum angular resolution of the sufficient granularity described above. That is, it is possible to continuously acquire only requested and sufficient distance information with the sufficient accuracy by sufficient number of parallel processing without radiating a light beam to the entire viewing angle at all times.

As an example of a reception circuit of the TOF ranging sensor 2, a configuration in which TOF signals of 4 channels are simultaneously subjected to parallel processing so that 4 pieces of distance information are able to be acquired in one measurement cycle is used. The number of parallel processing is a finite value defined when the reception circuit is designed, and is not able to be increased to any value. When the TOF ranging sensor 2 is operated by a method described below after the subspace group obtained by bundling the adjacent subspaces ds is defied, it is possible to acquire position information (target estimated position) and distance information of a target in a space of at least one subspace group that is defined. It is possible to greatly reduce total power consumption [W] of the TOF ranging sensor 2, which is consumed mostly on a light emission (light emitting unit 20) side, by at least one digit, compared with a three-dimensional camera system of a conventional method, such as a stereo camera or pattern light.

Figure 4:
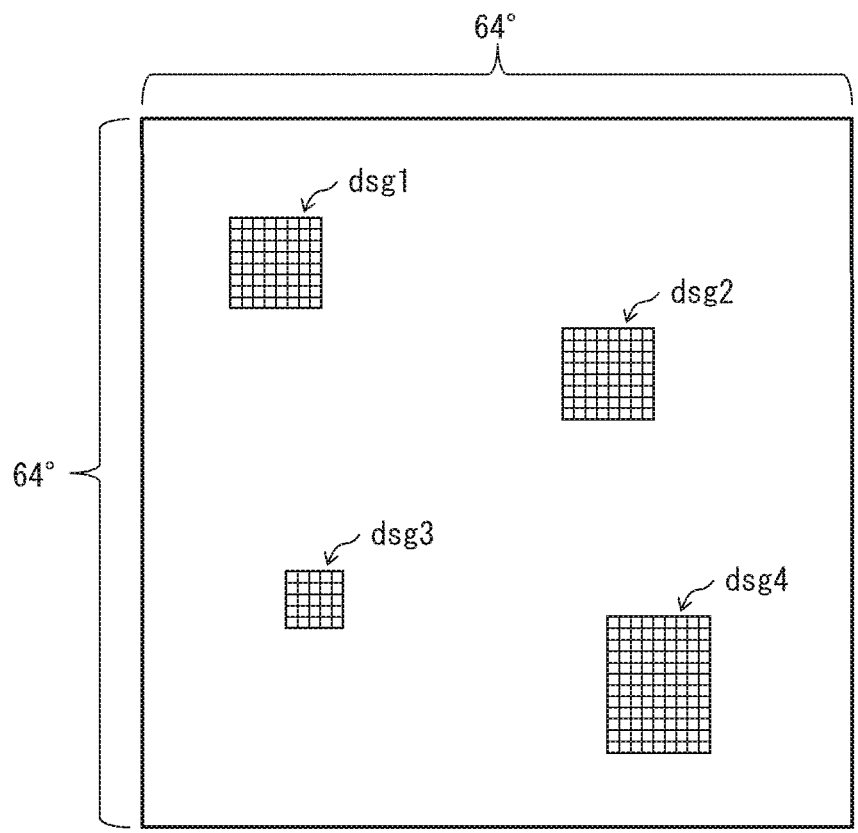
FIG. 4 is a schematic view for explaining an example of a method of generating distance information in the TOF ranging sensor in FIG. 1.

FIG. 4 is a schematic view for explaining an example of a method of generating distance information in the TOF ranging sensor 2. An example of a method in which estimated position information of 4 targets and distance information of estimated positions are generated by using the position estimation unit 24 and the TOF signal processing unit 25 of 4 channels with respect to the angle of view of 64° to simultaneously perform parallel processing of TOF signals of the 4 channels will be described below.

For example, the TOF ranging sensor 2 defines a first subspace group dsg1 to a fourth subspace group dsg4 by dividing the space s in accordance with a pattern described below, and generates target estimated position information and distance information of estimated positions on the basis of the defined first subspace group dsg1 to fourth subspace group dsg4. Note that, the pattern for defining the first subspace group dsg1 to the fourth subspace group dsg4 is not limited to one described below. Moreover, the number of channels is not limited to 4.

As illustrated in FIG. 4, the first subspace group dsg1 and the second subspace group dsg2 each correspond to 64 (8×8) subspaces ds that are adjacent to each other, that is, 64 light receiving elements 213. The third subspace group dsg3 corresponds to 25 (5×5) subspaces ds that are adjacent to each other, that is, 25 light receiving elements 213. The fourth subspace group dsg4 corresponds to 108 (12×9) subspaces ds that are adjacent to each other, that is, 108 light receiving elements 213.

As illustrated in FIG. 4, the number of subspace groups with any size is able to be simultaneously designated up to 4 in total as the first subspace group dsg1 to the fourth subspace group dsg4 at any positions in the entire angle of view. Position estimation of a target by the position estimation unit 24 and TOF signal processing for an output signal output from the light receiving element 213 closest to an estimated position or a light receiving element group including a plurality of light receiving elements 213 in a vicinity of the estimated position are performed with respect to 4 channels in parallel for each of the first to fourth subspace groups.

Figure 5:
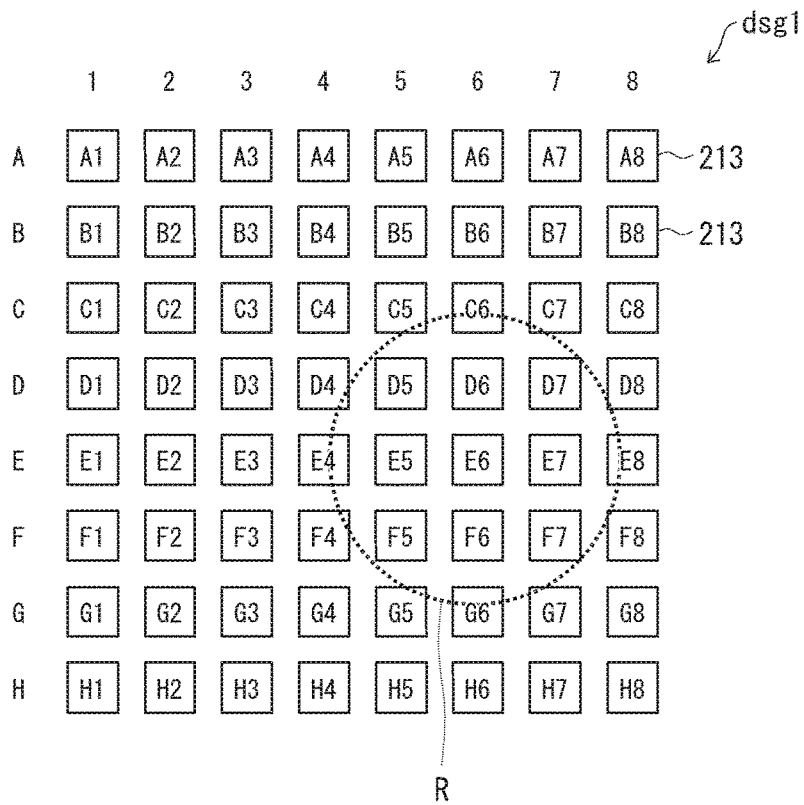
FIG. 5 is a schematic view of a light receiving element group corresponding to a first subspace group in FIG. 4.

FIG. 5 is a schematic view of a light receiving element group corresponding to the first subspace group dsg1. An example of an operation of the position estimation unit 24 during a period before a TOF measurement sequence of a measurement cycle will be described with reference to FIG. 5. In FIG. 5, a reflected light beam component R of a detection target is indicated by a circle dotted line. Output signals from the light receiving elements 213 (64 pieces in total including A1 to A8, B1 to B8, C1 to C8, D1 to D8, E1 to E8, F1 to F8, G1 to G8, and H1 to H8) corresponding to the first subspace group dsg1 are input to front end circuits connected to the respective light receiving elements 213 and converted into digital signals. The respective output signals of the front end circuits are input to counter circuits.

Figure 6:
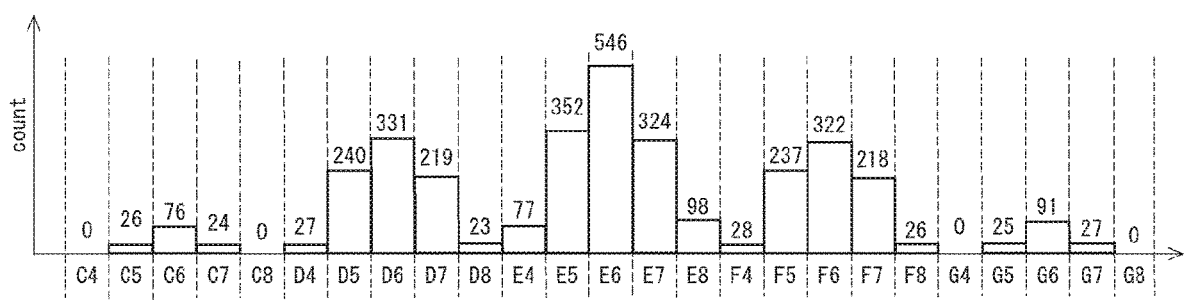
FIG. 6 illustrates a result of count values by counter circuits corresponding to light receiving elements in a vicinity of a reflected light beam component of a detection target in FIG. 5.

FIG. 6 illustrates a result of count values by counter circuits corresponding to light receiving elements 213 in a vicinity of the reflected light beam component R of the detection target in FIG. 5. As a method of estimating a position of a target in the first subspace group dsg1, for example, the position estimation unit 24 compares the count values and estimates the position of the target to be in a subspace ds corresponding to a light receiving element 213 whose count value is a maximum value. In an example illustrated in FIG. 6, a count value of "E6" is a maximum value "546", so that the position estimation unit 24 estimates the target to be in a subspace corresponding to a light receiving element 213 of "E6".

Note that, the method of estimating the position of the target by the position estimation unit 24 is not limited to the above. In addition, for example, the position estimation unit 24 may obtain a centroid position of distribution of the count values of the light receiving element group corresponding to the first subspace group dsg1 and estimate the position of the target to be in a subspace ds corresponding to a light receiving element 213 at a position ("E6" in FIG. 6) closest to the centroid position.

In the TOF ranging sensor 2, by selecting and using only an output signal of a front end circuit from a light receiving element 213 at the target position estimated by the position estimation unit 24, the TOF signal processing is performed during the TOF measurement sequence period. This makes it possible for the TOF ranging sensor 2 to acquire distance information of the estimated position of the target with minimum angular resolution (1°).

Moreover, during the TOF measurement sequence period, the number of light receiving elements 213 used for the TOF signal processing is not necessarily requested to be 1. For example, the distance information of the estimated position of the target may be acquired by performing digital OR processing of output signals of front end circuits from a group of adjacent light receiving elements which include the target position estimated by the position estimation unit 24 and in which a count value of a counter is a fixed value (certain proportion relative to a maximum count value) or more and using the resultant to perform the TOF signal processing.

In this case, although the angular resolution at the estimated position of the target is lowered depending on the number of adjacent light receiving elements 213 that are selected, fixed count values are acquired in a vicinity of the estimated position, so that it can be said that the target exists over a subspace group corresponding to the plurality of light receiving elements 213. Although the distance information acquired by the TOF ranging sensor 2 serves as average distance information of the target in the subspace group corresponding to the selected light receiving element group, operation accuracy for a calculated distance is able to be improved as a total number of signals used for the TOF signal processing increases.

By performing an operation in parallel also in the second subspace group dsg2 to the fourth subspace group dsg4 similarly to the first subspace group dsg1, the TOF ranging sensor 2 is able to acquire position information (target estimated position) and distance information of a target in a space of each of the plurality of subspace groups.

Moreover, the TOF ranging sensor 2 is also able to estimate a size of the target on the basis of the number of adjacent light receiving elements 213 of a light receiving element group, a count value of a counter of each of which is equal to or more than a predetermined value (for example, count value equal to or more than a certain proportion relative to the maximum count value) or more and may output information indicating the size of the target in the space of each of the plurality of subspace groups.

Figure 7:
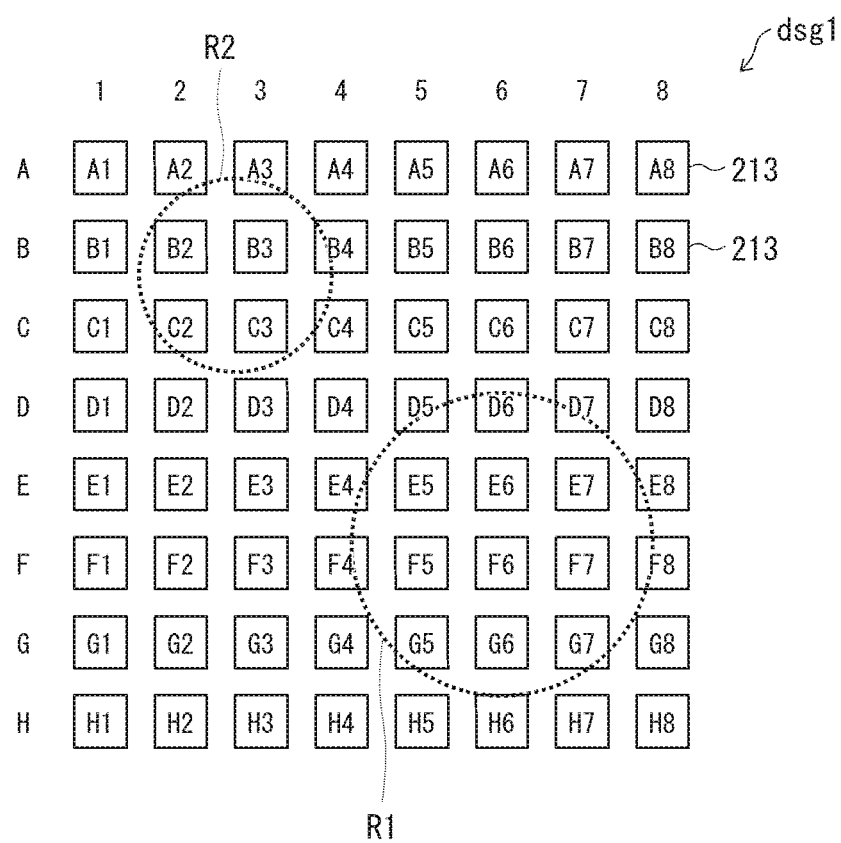
FIG. 7 illustrates an example in which there are a plurality of reflected light beam components of detection targets in the light receiving element group corresponding to the first subspace group in FIG. 4.

FIG. 7 illustrates an example in which there are a plurality of reflected light beam components of detection targets in the light receiving element group corresponding to the first subspace group dsg1. In the example illustrated in FIG. 7, there are two reflected light beam components R1 and R2 from the targets, which have fixed intensity or more. In this manner, when there are a plurality of targets, the position estimation unit 24 determines whether or not there are a plurality of targets on the basis of distribution of count values of counter circuits corresponding to the respective light receiving elements 213 of each of the subspace groups, and, in descending order of a received light amount, outputs results of estimated positions of a plurality of high-ranking targets.

In a case where positions of targets that are determined by the RGB camera module 3 to exist in the first subspace group dsg1 to the fourth subspace group dsg4 change with time, that is, the targets move, the host system 1 continuously acquires position information (which may include information about a size) and distance information of the targets in spaces of the respective subspace groups of the first subspace group dsg1 to the fourth subspace group dsg4, which are obtained by the TOF ranging sensor 2, and combines the resultant with two-dimensional imaging data (image information).

Thereby, the host system 1 recognizes current positions of the targets, and estimates moving amounts of the targets on the basis of the acquired results, and, while moving and resizing space regions of the first subspace group dsg1 to the fourth subspace group dsg4, in which measurement by the TOF ranging sensor 2 is performed, all the time, continuously acquires position information and distance information of the targets to thereby perform two-dimensional tracking TOF ranging.

Moreover, for a subspace group in which a plurality of targets are confirmed by information of determination about whether or not there are a plurality of targets in a space of each of the subspace groups of the first subspace group dsg1 to the fourth subspace group dsg4, the host system 1 is also able to perform two-dimensional tracking TOF ranging by dividing a space region for each of the targets that are confirmed. However, the number of channels allocated to other subspace groups whose priority is determined to be low is requested to be reduced.

Also in a case where correct positions of the targets that are determined by the RGB camera module 3 of the host system 1 to exist in the first subspace group dsg1 to the fourth subspace group dsg4 are unclear due to low contrast in two-dimensional imaging data (image information), the correct positions are able to be obtained by combining position information and distance information of the targets in the spaces of the respective subspace groups of the first subspace group dsg1 to the fourth subspace group dsg4, which are obtained by the TOF ranging sensor.

Here, it is requested to designate in advance a space region of a subspace group, in which measurement is performed, from a side of the host system 1 with respect to the TOF ranging sensor 2 by serial communication and switch the subspace group immediately at any timing. Thereby, the distance information of the targets that change depending on a situation is able to be acquired by using a tiny number of channels and a tiny number of emission beams, and power consumption of the TOF ranging sensor 2 is able to be made very low.

In this manner, the TOF ranging sensor 2 is able to acquire depth information that is truly useful in application to three-dimensional mapping for a mobile terminal while reducing influence on a battery of the mobile terminal. Note that, it is not necessary to use all of the 4 channels and less than 4 pieces of distance information may be acquired by reducing the number of channels to be used. This makes it possible to further reduce power consumption of the TOF ranging sensor 2.

Next, signal processing in the TOF ranging sensor 2 will be specifically described with reference to FIG. 8. FIG. 8 is a plan view illustrating a circuit block configuration of the TOF ranging sensor 2 in Embodiment 1. As illustrated in FIG. 8, a drive signal s1 from the light emitting element driving unit 23 is output to each of the light emitting elements 203 of the light emitting element array 201. The drive signal s1 is generated in the light emitting element driving unit 23 on the basis of a control signal s2 from the space control unit 22.

It is to be noted that occurrence of timing skew between drive signals s1 that switch ON/OFF of driving of the respective light emitting elements 203 is to be suppressed. The light emitting element driving unit 23 distributes an ON/OFF signal to a light emitting element 203 to be driven and outputs only an OFF signal to a light emitting element 203 not to be driven. Note that, though not illustrated, bias current which has a variable value or a fixed value and compensates for threshold current may be supplied to each of the light emitting elements 203.

The TOF ranging sensor 2 performs control that only a light emitting element group of the light emitting elements 203 allocated to the subspaces ds that form the above-described first subspace group dsg1 to fourth subspace group dsg4 defined as the operation mode designated in advance by the side of the host system 1 to the TOF ranging sensor 2, among aggregates of the subspaces ds subjected to space division multiplexing, is caused to emit light and a light emitting element group of the light emitting elements 203 that are not designated by the host system 1 is shut down, for example, during a period which is a period before the TOF measurement sequence and in which a position of a target is estimated by the position estimation unit 24.

Here, as a method of setting the first subspace group dsg1 to the fourth subspace group dsg4, by using two-dimensional coordinates (X, Y) corresponding to the respective subspaces ds(i, j) and ds(m, n), position information of each of the subspace groups that are desired to be set to a register 29 may be input. Specifically, for example, each of the subspace groups may be set by inputting, to the register 29, two-dimensional coordinates (X, Y) serving as a reference point of the subspace group, a subspace width in an X-axis direction (number of subspaces in the X-axis direction), and a subspace width in a Y-axis direction (number of subspaces in the Y-axis direction) for each of the subspace groups that are desired to be set. The coordinates serving as the reference point may be any of an upper-right end, a lower-right end, an upper-left end, a lower-left end, and a center of the subspace group.

Note that, the method of setting the subspace group by the space control unit 22 is not limited to the aforementioned setting method. Additionally, for each of the subspace groups that are desired to be set, the space control unit 22 may set the subspace group by inputting, to the register 29 of the TOF ranging sensor 2, two points of coordinates at the upper-right end and coordinates at the lower-left end in the subspace group or two points of coordinates at the upper-left end and coordinates at the lower-right end.

In the TOF measurement sequence, control is performed that only a light emitting element 203 allocated to the subspace ds corresponding to the target estimated position in each of the first subspace group dsg1 to the fourth subspace group dsg4 described above or only a light emitting element group allocated to a group of adjacent subspaces including the subspace ds corresponding to the target estimated position in each of the first subspace group dsg1 to the fourth subspace group dsg4, among aggregates of the subspaces ds subjected to space division multiplexing, is caused to emit light and other light emitting elements 203 are shut down, for example. Thereby, it is possible to finely control a space (angle) region in which the TOF ranging sensor 2 actually performs sensing.

In this manner, the TOF ranging sensor 2 irradiates only the designated subspace ds or subspace group with the light beam Lout, so that it is possible to drastically reduce power consumption of the TOF ranging sensor 2.

Additionally, all of output signals s3 from the respective light receiving elements 213 of the light receiving element array 211 are once input to a selector 28. Also in this case, similarly, it is to be noted that occurrence of timing skew between the output signals s3 is to be suppressed.

In the TOF ranging sensor 2, during the period before the TOF measurement sequence of the measurement cycle, on the basis of a control signal s4 from the space control unit 22, output signals s3 of a plurality of light receiving elements 213 selected for the respective subspace groups of the first subspace group dsg1 to the fourth subspace group dsg4 are transmitted to an output portion (not illustrated) from the selector 28 to the position estimation unit 24. In the TOF measurement sequence, on the basis of a control signal s5 from the space control unit 22, output signals s3 of the light receiving elements 213 allocated to the subspace ds corresponding to the target estimated position in each of the first subspace group dsg1 to the fourth subspace group dsg4 or a light receiving element group allocated to a group of adjacent subspaces including the subspace ds corresponding to the target estimated position in each of the first subspace group dsg1 to the fourth subspace group dsg4 are transmitted from the selector 28 to an output portion (not illustrated) of the TOF signal processing unit 25. Note that, in a case of the light receiving element group, a logical sum of digital signals is obtained at the output portion (not illustrated) from the selector 28 to the TOF signal processing unit 25 (digital OR operation).

During a period which is a period before the TOF measurement sequence and in which a position of a target is estimated by the position estimation unit 24, the TOF ranging sensor 2 performs control that only an output from an element group of the light receiving elements 213 allocated to the subspaces ds that form each of the above-described first subspace group dsg1 to fourth subspace group dsg4 defined as the operation mode designated in advance by the side of the host system 1 to the TOF ranging sensor 2, among aggregates of the subspaces ds subjected to space division multiplexing, is selected and input to the position estimation unit 24, and an output from another element group of the light receiving elements 213 that are not designated by the host system 1 is not input to the position estimation unit 24, for example.

In the TOF measurement sequence, control is performed that only an output from the light receiving element 213 allocated to the subspace ds corresponding to the target estimated position in each of the above-described first subspace group dsg1 to fourth subspace group dsg4 or only an output from a light receiving element group allocated to a group of adjacent subspaces including the subspace ds corresponding to the target estimated position in each of the first subspace group dsg1 to the fourth subspace group dsg4, among aggregates of the subspaces ds subjected to space division multiplexing, is selected or combined and input to the TOF signal processing unit 25, and an output from another element group of the light receiving elements 213 is not input to the TOF signal processing unit, for example. Thereby, it is possible to finely control a space (angle) region in which the TOF ranging sensor 2 actually performs sensing.

In this manner, the TOF ranging sensor 2 performs TOF signal processing of the reflected light beam Lout reflected from the target only for the light receiving element 213 allocated to each of the subspaces ds corresponding to the target estimated position by the position estimation unit 24 with respect to each of the first to fourth subspace groups (dsg1 to dsg4) defined as the operation mode designated in advance by the side of the host system 1 or only for the light receiving element group allocated to the group of the adjacent subspaces including the subspace ds corresponding to the target estimated position in each of the first subspace group dsg1 to the fourth subspace group dsg4.

Thereby, on the basis of position information (which may include information about a size) of the target and reciprocation time of the reflected light beam Lout from the target existing in each of the designated first subspace group dsg1 to fourth subspace group dsg4, the TOF ranging sensor 2 is able to acquire distance information of the target.

In the TOF ranging sensor 2 described above, position information (which may include information about a size) and distance information of a target (of 4 channels in this case) existing in a two-dimensional subspace group (two-dimensional angle region with respect to the real space), which is designated in advance and constituted by the subspaces ds, are stored in the register 29.

As a method of output to the register 29, for example, distance information and target information of target estimated positions in the first subspace group dsg1 to the fourth subspace group dsg4 are output to respective register output addresses decided in accordance with register input addresses of the respective subspace groups, that is, register output addresses decided in advance for the respective subspace groups of the first subspace group dsg1 to the fourth subspace group dsg4. In this case, it is possible to facilitate, when a subspace group for which confirmation is desired to be performed among the first subspace group dsg1 to the fourth subspace group dsg4 is decided, access to target information in the subspace group.

Note that, the method of output to the register 29 is not limited thereto. Additionally, for example, to register addresses decided in order for a plurality of pieces of high-ranking distance information arranged in ascending order of distance among distance information of the target estimated positions of the respective subspace groups of the first subspace group dsg1 to the fourth subspace group dsg4, information of the targets including the distance information acquired by the ranging sensor may be output. In this case, it is possible to facilitate access to information about a target at a closest distance in the respective subspace groups.

Here, for the three-dimensional camera system on which the TOF ranging sensor 2 is mounted, information about a target at a closer distance to the TOF ranging sensor 2 is more useful than information about a target at a farther distance in many cases. That is, a close target whose proportion in a screen appears to be large and whose moving amount is large is often to be handled with priority by an apparatus on which the three-dimensional camera system is mounted. Accordingly, when access to information about the target at a close distance in the respective subspace groups is facilitated, processing capacity of the host system 1 is able to be improved.

The RGB camera module 3 is able to access the distance information via the communication unit 26 and generate three-dimensional depth information of a target from one-dimensional distance information obtained with respect to two-dimensional angle coordinates in the real space.

The method in which the TOF ranging sensor 2 acquires the distance information by designating the first subspace group dsg1 to the fourth subspace group dsg4 from the host system 1 as described above is greatly useful for reducing a load of image rendering processing in the host system 1. On the other hand, as described below, in the TOF ranging sensor 2, it is also possible to determine whether or not a target exists in the first subspace group dsg1 to the fourth subspace group dsg4 that are designated in advance.

In general, distance information output from the TOF ranging sensor 2, that is, a distance estimation value based on TOF signal processing greatly fluctuates in accordance with shortage of a light amount of a signal or SNR (Signal to Noise Ratio) due to a ranging limit (a long distance, low reflectivity, a large amount of disturbance light, or the like) and reproducibility is deteriorated. Additionally, when the SNR is below an allowable limit value, a TOF distance estimation value diverges to a state where an average value thereof becomes unable to be defined. It is not desirable to notify the host system 1 of data with low reliability as it is for an operation, so that the TOF signal processing unit 25 usually applies an error flag for each output distance information.

The flag is expressed as a low signal bit that indicates that count values of all the light receiving elements 213 in a subspace group are less than a fixed value in a counter result of the position estimation unit 24 during the period before the TOF ranging sequence, an invalid bit that indicates invalidity because the distance estimation value or a variable deviation thereof deviates from a predefined range, or a warning or error bit based on an action of any measurement value or estimation value obtained in a process of the TOF signal processing, and is information indicating reliability of the distance information. Note that, also on the side of the host system 1, processing of avoiding fatal operation failure, such as processing of acquiring a running average of the distance information output from the TOF ranging sensor 2 to monitor a situation of the SNR, is generally performed.

On the basis of the example of determination processing as described above, in a case where, in an inside of the TOF ranging sensor 2, a subspace group is determined as a subspace group in which the SNR is remarkably lowered, that is, the reliability of the distance information is low, in the first subspace group dsg1 to the fourth subspace group dsg4, it is possible to perform determination that a target to be targeted for ranging "does not exist" in the subspace group. In this case, mask with flag is performed so that the host system 1 does not adopt the distance estimation value with low reliability.

Further, the space control unit 22 is able to control driving of each of the light emitting elements 203 corresponding to each of the subspace groups or the element group and connection (the aforementioned analog sum or digital logical sum) of each of the light receiving elements 213 or the element group on the basis of information about presence or absence of a target, which is determined in each of the first subspace group dsg1 to the fourth subspace group dsg4 that are designated in advance as described above. This makes it possible to achieve further reduction in power consumption by locally stopping an internal operation of the TOF ranging sensor 2 from the space control unit 22, for example, so that the TOF ranging sensor 2 does not emit the light beam Lout or does not perform the TOF signal processing for each of the subspace groups in which useful distance information is not able to be acquired in the first subspace group dsg1 to the fourth subspace group dsg4 that are designated in advance.

(Effect of TOF Ranging Sensor)

The TOF ranging sensor 2 in Embodiment 1 described above is a ranging sensor using a TOF method, which operates in cooperation with the RGB camera module 3, measures time during which a light beam Lout radiated to the space s is reflected by a target and returned, and outputs distance information of the target for generating three-dimensional position information by combining the distance information with image information acquired by the RGB camera module 3. The TOF ranging sensor 2 includes: the light emitting unit 20 that includes the plurality of light emitting elements 203 arrayed in plane and that radiates, toward the subspaces ds obtained by dividing the spaces, light beams emitted from of the light emitting elements 203 allocated to the subspaces ds by forming a beam by the light emitting lens system 202; the light receiving unit 21 that includes the plurality of light receiving elements 213 arrayed in plane, and that receives, by the light receiving elements 213 allocated to the subspaces ds, reflected light beams Lout received from the respective subspaces ds by forming images of the reflected light beams on the light receiving elements 213 by the light receiving lens system 212; and the space control unit 22 that independently controls each element group that includes a light emitting element 203 and a light receiving element 213 which are allocated to a common one of the subspaces ds.

Since the TOF ranging sensor 2 configured as described above is able to independently control each element group including the light emitting element 203 and the light receiving element 213 that are allocated to each of the subspaces ds, it is possible to efficiently operate the TOF ranging sensor 2 by selectively driving only a minimum number of element groups. Further, since it is not necessary to provide an MEMS mirror or the like, it is possible to achieve simplification of an apparatus configuration and reduction in size and cost while keeping high ranging accuracy and spatial resolution.

Additionally, the TOF ranging sensor 2 is able to designate, with the number of channels as an upper limit number, a plurality of subspace groups each obtained by bundling a plurality of adjacent subspaces ds from an entirety of the subspaces ds on the basis of the image information from the RGB camera module 3 capable of operating in cooperation, acquire, for the respective subspace groups, estimated position information (which may include information about a size) of targets in spaces of the respective subspace groups by the position estimation unit 24 and distance information corresponding to estimated positions by the TOF signal processing unit 25, and output the resultant to the host system 1. Thus, according to the TOF ranging sensor 2 of Embodiment 1, it is possible to realize the TOF ranging sensor 2 that is most suitable to be mounted on a mobile device, operates in cooperation with the RGB camera module 3, and is able to achieve reduction in power consumption, size, and cost.

In the host system 1, in a case where positions of targets that exist in the first subspace group dsg1 to the fourth subspace group dsg4 change with time, that is, the targets move, position information (which may include information about a size) and distance information of the targets in spaces of the respective subspace groups of the first subspace group dsg1 to the fourth subspace group dsg4, which are obtained by the TOF ranging sensor 2, are continuously acquired and combined with two-dimensional imaging data (image information). Thereby, the host system 1 recognizes current positions of the targets, and estimates moving amounts of the targets on the basis of a continuously acquired result, and, while moving and resizing space regions of the first subspace group dsg1 to the fourth subspace group dsg4, in which measurement by the TOF ranging sensor 2 is performed, at all time, continuously acquires position information and distance information of the targets, thus making it possible to perform two-dimensional tracking TOF ranging.

Moreover, for a subspace group in which a plurality of targets are confirmed by information of determination about whether or not there are a plurality of targets in a space of each of the subspace groups of the first subspace group dsg1 to the fourth subspace group dsg4, the host system 1 is also able to perform two-dimensional tracking TOF ranging by dividing a space region for each of the targets that are confirmed. However, the number of channels allocated to another subspace group whose priority is determined to be low is requested to be reduced.

Also in a case where correct positions of the targets that are determined by the host system 1 to exist in the first subspace group dsg1 to the fourth subspace group dsg4 are unclear due to low contrast in two-dimensional imaging data (image information), the positions of the targets are able to be correctly estimated by combining position information and distance information of the targets in the spaces of the respective subspace groups of the first subspace group dsg1 to the fourth subspace group dsg4, which are obtained by the TOF ranging sensor.

Embodiment 2

Figure 9:
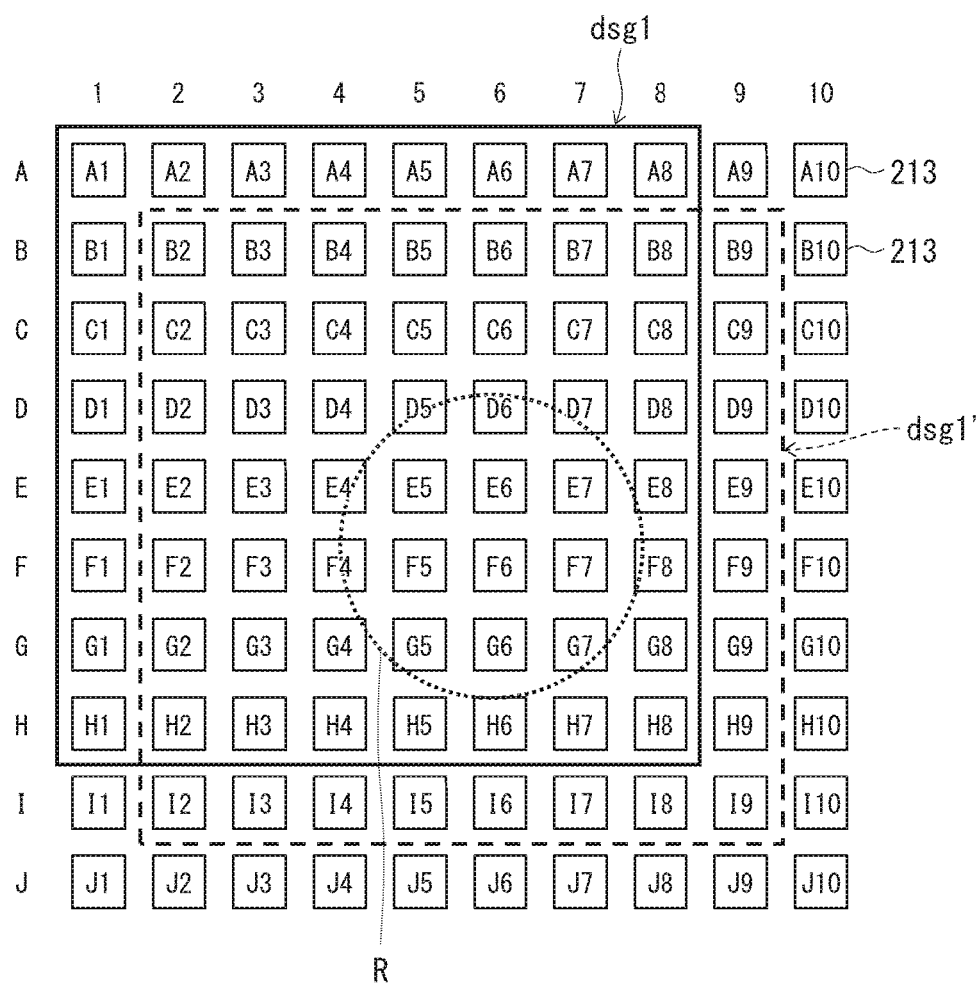
FIG. 9 is a schematic view illustrating a light receiving element group corresponding to a first subspace group in Embodiment 2 of the disclosure and light receiving elements in a vicinity thereof.
Figure 10:
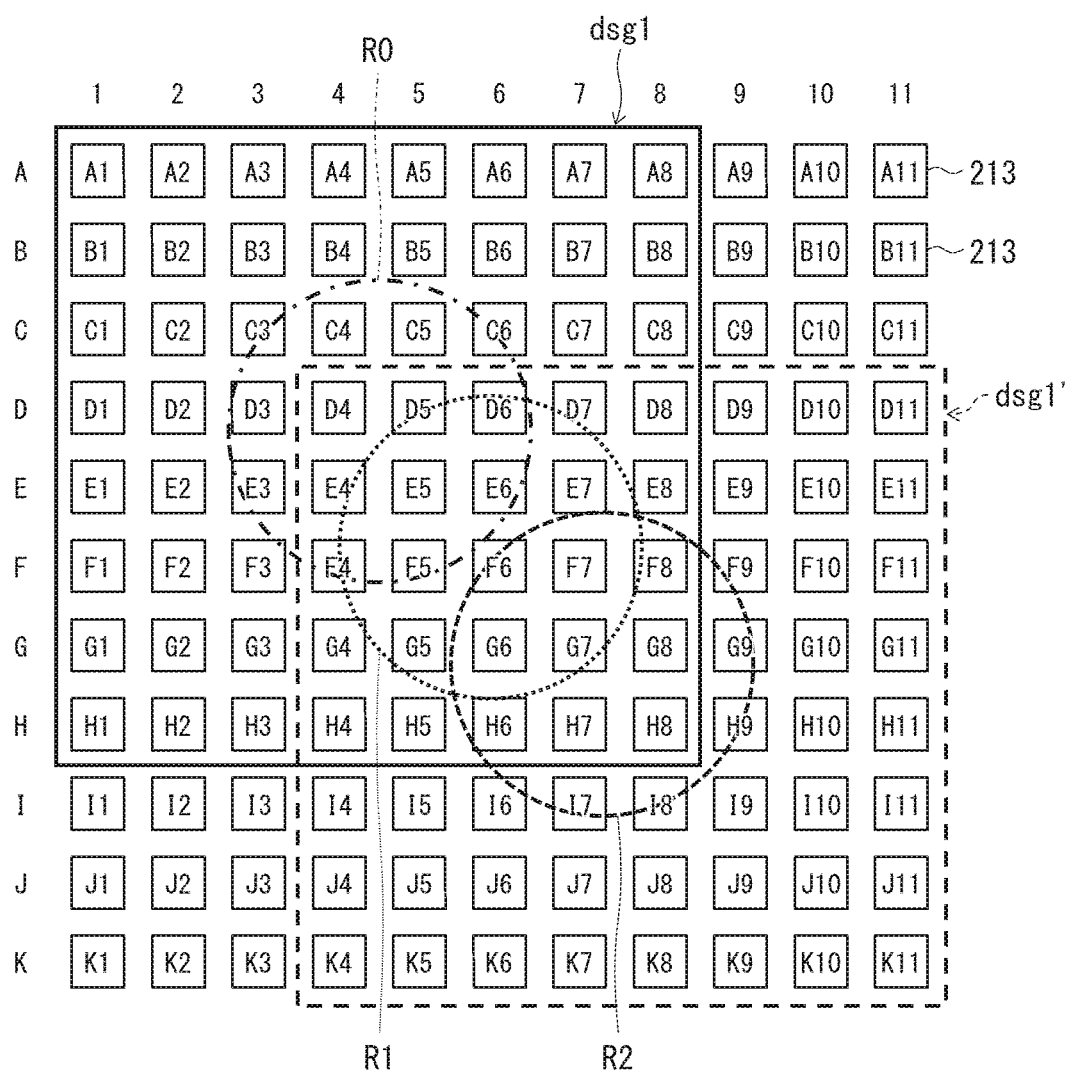
FIG. 10 is a schematic view illustrating a state of a reflected light beam component of a detection target that moves on the light receiving element group corresponding to the first subspace group in FIG. 9.

A host system in Embodiment 2 of the disclosure will be described with reference to FIGS. 9 and 10. FIG. 9 is a schematic view illustrating a state where a light receiving element group corresponding to a first subspace group in Embodiment 2 moves. FIG. 10 is a schematic view illustrating a state of a reflected light beam component of a detection target that moves on the light receiving element group corresponding to the first subspace group in FIG. 9.

(Configuration and Operation of TOF Ranging Sensor)

A basic configuration of the host system in Embodiment 2 is similar to that of the host system 1 in Embodiment 1, so that respective members will be given the same reference signs as the reference signs in Embodiment 1 for convenience of description (refer to FIG. 1). The host system 1 of Embodiment 2 is different from that of Embodiment 1 in that the space control unit 22 updates setting of a subspace group on the basis of output information of the TOF ranging sensor 2 itself as described below.

In a case where positions of targets that are determined by the RGB camera module 3 to exist in the first subspace group dsg1 to the fourth subspace group dsg4 change with time, that is, the targets move, the space control unit 22 of the TOF ranging sensor 2 in Embodiment 2 continuously acquires position information (which may include information about a size and information about presence or absence of the plurality of targets) and distance information of the targets that are in spaces of the respective subspace groups of the first subspace group dsg1 to the fourth subspace group dsg4, which are obtained by the TOF ranging sensor 2.

Then, the space control unit 22 recognizes current positions of the targets, and estimates moving amounts of the targets on the basis of a continuously acquired result, and, while moving and resizing space regions of the first subspace group dsg1 to the fourth subspace group dsg4, in which measurement by the TOF ranging sensor 2 is performed, at all time, automatically supplements the targets. In this manner, the TOF ranging sensor 2 of Embodiment 2 continuously acquires position information and distance information of the targets while two-dimensionally tracking the targets, and thereby measures distances to the targets.

In FIG. 9, a reflected light beam component R of a current detection target is indicated by a circle dotted line. On the basis of distribution of count values acquired by counter circuits, the position estimation unit 24 estimates a position of the target to be in a vicinity of a lower-right part (vicinity of F6 in FIG. 9) in the first subspace group dsg1 that is currently selected. In this case, the space control unit 22 moves a space region to a first subspace group dsg1', which is selected at a time of next measurement, so that an estimated position (vicinity of F6 in FIG. 9) of the current target is positioned in a vicinity of a center of the first subspace group dsg1'.

Moreover, the space control unit 22 estimates a moving speed and a moving direction of the target on the basis of a reflected light beam component R0 of a previous detection target and a reflected light beam component R1 of the current detection target as illustrated in FIG. 10. Specifically, the space control unit 22 estimates the target to have moved from a vicinity of "D4" in FIG. 10 to the vicinity of "F6". On the basis of the estimation, the space control unit 22 estimates a reflected light beam component R2 of a next detection target to move to a vicinity of "H8" in FIG. 10. Then, the space control unit 22 moves a space region to the first subspace group dsg1', which is selected at the time of next measurement, so that the target is positioned in the vicinity of the center of the first subspace group dsg1'.

Note that, though not illustrated, in a case of estimating a size of the target relative to the first subspace group dsg1' to be smaller than that in the first subspace group dsg1 which is currently selected or in a case of estimating the moving speed of the target to be slow on the basis of a result continuously acquired from a previous time, the space control unit 22 may reduce a size of the first subspace group dsg1' which is selected at the time of next measurement. On the contrary, in a case of estimating the size of the target relative to the first subspace group dsg1' to be larger than that in the first subspace group dsg1 which is currently selected or in a case of estimating the moving speed of the target to be fast on the basis of the result continuously acquired from the previous time, the space control unit 22 may increase the size of the first subspace group dsg1' which is selected at the time of next measurement.

(Effect of TOF Ranging Sensor)

The TOF ranging sensor 2 in Embodiment 2 described above is able to acquire, for each of subspace groups, estimated position information (which may include information about a size and information about presence or absence of a plurality of targets) of the targets and distance information corresponding to estimated positions in the spaces of the first subspace group dsg1 to the fourth subspace group dsg4, and combine the resultant with reliability of the distance information, and thereby control signal connection to the light emitting element array 201 and signal connection from the light receiving element array 211 through the space control unit 22 by the TOF ranging sensor 2 itself, designate positions and sizes of the first subspace group dsg1 to the fourth subspace group dsg4 that are to be formed by the TOF ranging sensor 2 itself, and continue a TOF ranging operation while automatically supplementing the targets.

Accordingly, the TOF ranging sensor 2 in Embodiment 2 is able to two-dimensionally divide a three-dimensional space in an angle region and, when obtaining distance information in each region, automatically update the two-dimensional angle region in which distance information is actually to be acquired. Thereby, the TOF ranging sensor 2 of Embodiment 2 is able to greatly reduce total current consumption of the TOF ranging sensor 2, which is consumed principally on a side of the light emitting unit 20, compared with a conventional technique. Further, it is possible to acquire truly useful three-dimensional depth information without giving an excessive load of image signal processing to the host system 1.

In this manner, in Embodiment 2, the TOF signal processing including determination of presence or absence of a target is performed once for the first subspace group dsg1 to the fourth subspace group dsg4 that are designated in advance on the basis of a result of image analysis of the host system 1. Thereafter, for each of subspace groups in which information about a target is able to be acquired, the TOF ranging sensor 2 itself automatically supplements the target and continues the TOF signal processing. As a result, the TOF ranging sensor 2 is able to achieve a two-dimensional tracking operation that is greatly useful for practical use from viewpoints of operability and power consumption.

Note that, instead of designating the first subspace group dsg1 to the fourth subspace group dsg4 from the side of the host system 1, the TOF ranging sensor 2 itself is also able to perform, similarly to the above, complete two-dimensional tracking TOF ranging of automatically supplementing a target by, prior to a continuous operation, dividing the entire field angle, performing scanning, and determining a subspace in which a target exits.

CONCLUSION

A ranging sensor (TOF ranging sensor 2) according to an aspect 1 of the disclosure is a ranging sensor using a TOF method, which operates in cooperation with a camera module (RGB camera module 3), measures time during which a beam (light beam Lout) radiated to a space is reflected by a target and returned, and generates distance information of the target for generating three-dimensional position information by combining the distance information with image information acquired by the camera module, and the ranging sensor includes: a light emitting unit that includes a plurality of light emitting elements arrayed in plane and radiates, toward subspaces obtained by dividing the space, light beams from the light-emitting elements allocated to the respective subspaces by forming a beam by a light emitting lens system; a light receiving unit that includes a plurality of light receiving elements arrayed in plane, and receives reflected light beams from the respective subspaces by forming images of the reflected light beams on the light receiving elements, which are allocated, by a light receiving lens system; a space control unit that independently controls each element group including a light emitting element and a light receiving element, which are allocated to a common one of the subspaces, and that sets at least one subspace group that is designated in advance on a basis of the image information and obtained by bundling a plurality of adjacent subspaces; a position estimation unit that estimates, on a basis of received light amount distribution of the plurality of light receiving elements that receive a reflected light beam from the target existing in a space of each subspace in the subspace group set by the space control unit, a position of the target in the space of the subspace group; and a TOF signal processing unit that performs TOF signal processing in parallel with channels whose number is less than the number of the light emitting elements and acquires the distance information whose number is equal to or less than the number of channels.

According to the aforementioned configuration, the space control unit sets the subspace group, and the position estimation unit estimates the position of the target on the basis of the received light amount distribution of the light receiving elements that receive the reflected light beam from the target existing in the space of each subspace. Then, the TOF signal processing unit performs the TOF signal processing in parallel with channels whose number is less than the number of the light emitting elements and acquires the distance information whose number is equal to or less than the number of channels. Thereby, the distance information of the moving target is able to be acquired by using a small number of channels and a small number of light emitting elements and power consumption of the ranging sensor is able to be made very low. Additionally, since it is not necessary to provide an MEMS mirror or the like, it is possible to achieve simplification of an apparatus configuration and reduction in size and cost while keeping high ranging accuracy and spatial resolution.

That is, when the space control unit independently controls each element group including the light emitting element and the light receiving element that are allocated to each of the subspaces, it is possible to achieve the ranging sensor using the TOF method, which operates in cooperation with the camera module mounted on a mobile device by selectively driving only a minimum number of element groups, is capable of measuring the distance to the moving target while performing two-dimensional tracking, and achieves both reduction in power consumption and reduction in size and cost.

In the ranging sensor according to an aspect 2 of the disclosure, in the aspect 1, the TOF signal processing unit may perform, in each subspace of the subspace group set by the space control unit, the TOF signal processing by using the light receiving element allocated to the subspace corresponding to an estimated position of the target, which is estimated by the position estimation unit, or by using a light receiving element group including the plurality of light receiving elements allocated to a plurality of subspaces that include the subspace corresponding to the estimated position of the target and an adjacent subspace in a vicinity of the subspace, and acquire the distance information of the estimated position obtained by the position estimation unit.

According to the aforementioned configuration, the TOF signal processing is performed by using the light receiving element allocated to the subspace corresponding to the estimated position of the target, which is estimated by the position estimation unit, or the light receiving element group allocated to the plurality of subspaces that include the subspace corresponding to the estimated position of the target and an adjacent subspace in a vicinity of the subspace. Thereby, as compared to a case where the position of the target is not estimated, the distance information of the estimated position of the target is able to be acquired only by using a small number of light receiving elements and entire power consumption of the ranging sensor is able to be reduced.

In the ranging sensor according to an aspect 3 of the disclosure, in the aspect 1 or 2, the TOF signal processing unit may acquire, in each subspace of the subspace group set by the space control unit, information indicating reliability of the distance information corresponding to the estimated position of the target, which is estimated by the position estimation unit.

According to the aforementioned configuration, it is possible to suppress generation of three-dimensional position information with use of distance information with low reliability.

In the ranging sensor according to an aspect 4 of the disclosure, in any of the aspects 1 to 3, the position estimation unit may estimate a size of the target on a basis of the received light amount distribution of the plurality of light receiving elements that receive the reflected light beam from the target existing in the space of the subspace group set by the space control unit and acquire information indicating the size of the target at the estimated position obtained by the position estimation unit.

According to the aforementioned configuration, the ranging sensor is able to estimate the size of the target on the basis of the received light amount distribution of the plurality of light receiving elements that receive the reflected light beam from the target, and therefore, by moving and resizing a space region of each subspace group, in which measurement is performed, all the time, while continuously acquiring the position information, which includes the information about the size of the target, and the distance information, two-dimensional tracking TOF ranging is able to be implemented.

In the ranging sensor according to an aspect 5 of the disclosure, in any of the aspects 1 to 4, the position estimation unit may determine whether or not there are a plurality of targets in the space of the subspace group on a basis of the received light amount distribution of the plurality of light receiving elements that receive the reflected light beam from the target existing in the space of the subspace group set by the space control unit and acquire estimated position results of a plurality of high-ranking targets in descending order of a received light amount.

According to the aforementioned configuration, in a case where there are a plurality of targets in the space of the subspace group, when the estimated position results of the targets are acquired in descending order of a received light amount, two-dimensional tracking TOF ranging for the plurality of targets is able to be performed by dividing a space region in the space of the subspace group for each of the targets that are confirmed, under condition that the number of channels allocated to another subspace group whose priority is determined to be low is reduced.

In the ranging sensor according to an aspect 6 of the disclosure, in any of the aspects 1 to 5, the ranging sensor may output at least part of information that is acquired to a register.

According to the aforementioned configuration, for example, when the information acquired by the ranging sensor is saved in the register so as to be arranged in predefined order, acquisition information of the ranging sensor, which is desired to be confirmed, is able to be easily acquired.

In the ranging sensor according to an aspect 7 of the disclosure, in the aspect 6, the space control unit may use two-dimensional coordinates corresponding to the respective subspaces obtained by dividing the space to input, to the register, position information of the subspace group which is desired to be set, and set the subspace group.

According to the aforementioned configuration, since the space control unit uses the two-dimensional coordinates corresponding to the respective subspaces to input, to the register, the position information of the subspace group which is desired to be set, and thereby sets the subspace group, so that it is possible to perform control with high accuracy that only a light emitting element allocated to a subspace corresponding to an estimated position of each target in each subspace group is caused to emit light and another light emitting element is shut down. Thereby, it is possible to finely control a space (angle) region in which the ranging sensor actually performs sensing and greatly reduce power consumption of the ranging sensor.

In the ranging sensor according to an aspect 8 of the disclosure, in the aspect 7, the space control unit may input, to the register, two-dimensional coordinates serving as a reference point of the subspace group, a subspace width (number of the subspaces in one axial direction) in the one axial direction and a subspace width (number of the subspaces in the other axial direction) in the other axial direction, for each of subspace groups that are desired to be set.

According to the aforementioned configuration, by inputting, to the register, the two-dimensional coordinates serving as the reference point of the subspace group, the subspace width (number of the subspaces in one axial direction) in the one axial direction and the subspace width (number of the subspaces in the other axial direction) in the other axial direction, the space control unit is able to finely control a space (angle) region in which the ranging sensor actually performs sensing.

In the ranging sensor according to an aspect 9 of the disclosure, in the aspect 7, the space control unit may input, to the register, two points of coordinates of an upper-right end and coordinates of a lower-left end or two points of coordinates of an upper-left end and coordinates of a lower-right end in the subspace group, for each of subspace groups that are desired to be set.

According to the aforementioned configuration, the space control unit is able to use, as the reference point of the subspace group, coordinates of the two points of the upper-right end and the lower-left end or the two points of the upper-left end and the lower-right end in the subspace group and easily perform setting of the subspace group.

In the ranging sensor according to an aspect 10 of the disclosure, in any of the aspects 1 to 6, in each subspace of the subspace group set by the space control unit, the space control unit may update setting of the subspace group on a basis of output information of the ranging sensor for the target in the space of the subspace group.

According to the aforementioned configuration, the ranging sensor is able to two-dimensionally divide a three-dimensional space in an angle region and, when obtaining distance information in each region, automatically update the two-dimensional angle region in which distance information is actually to be acquired. Thereby, it is possible to reduce power consumption in the light emitting unit and greatly reduce total power consumption of the ranging sensor. It is also possible to acquire truly useful three-dimensional depth information without giving an load of image signal processing.

In the ranging sensor according to an aspect 11 of the disclosure, in the aspect 10, to a register address decided in order for a plurality of pieces of high-ranking distance information arranged in ascending order of distance among the distance information of the estimated position of the target in the subspace group set by the subspace control unit, information of the target, which includes the distance information that is acquired, may be output.

According to the aforementioned configuration, information of targets that are estimated to be at a close distance to the ranging sensor is able to be acquired with priority from one at a closer distance.

In the ranging sensor according to an aspect 12 of the disclosure, in the aspect 10, outputs of the distance information and the target information of the estimated position of the target in the subspace group set by the space control unit may be output to a register output address decided in accordance with an input address of each register in the subspace group.

According to the aforementioned configuration, since the distance information and the target information of the estimated position of the target in each subspace group are output to the register output address decided in accordance with the input address of each register in each subspace group, it is possible to facilitate, when a subspace group for which confirmation is desired to be performed is decided, acquisition of target information in the subspace group.

The disclosure is not limited to each of the embodiments described above and may be modified in various manners within the scope indicated in the claim, and an embodiment achieved by appropriately combining techniques disclosed in each of different embodiments is also encompassed in the technical scope of the disclosure. Further, by combining the techniques disclosed in each of the embodiments, a new technical feature may be formed.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A ranging sensor using a TOF method, which operates in cooperation with a camera module, measures time during which a beam radiated to a space is reflected by a target and returned, and generates distance information of the target for generating three-dimensional position information by combining the distance information with image information acquired by the camera module, the ranging sensor comprising:
    a light emitting unit that includes a plurality of light emitting elements arrayed in plane and radiates, toward subspaces obtained by dividing the space, light beams from each of the plurality of light emitting elements allocated to the respective subspaces by forming a beam by a light emitting lens system;
    a light receiving unit that includes a plurality of light receiving elements arrayed in plane, and receives reflected light beams from the respective subspaces by forming images of the reflected light beams on each of the plurality of light receiving elements, which are allocated, by a light receiving lens system;
    a space control unit that independently controls each element group including each of the plurality of light emitting elements and each of the plurality of light receiving elements, which are allocated to a common one of the subspaces, and that sets at least one subspace group that is designated in advance on a basis of the image information and obtained by bundling a plurality of adjacent sub spaces;
    a position estimation unit that estimates, on a basis of received light amount distribution of the plurality of light receiving elements that receive a reflected light beam from the target existing in a space of each subspace in the subspace group set by the space control unit, a position of the target in the space of the subspace group; and
    a TOF signal processing unit that performs TOF signal processing in parallel with channels whose number is less than the number of the light emitting elements and acquires the distance information whose number is equal to or less than the number of channels, wherein the TOF signal processing unit performs, in each subspace of the subspace group set by the space control unit, the TOF signal processing by using only the light receiving element allocated to the subspace corresponding to an estimated position of the target, which is estimated by the position estimation unit, or by using only a light receiving element group including the plurality of light receiving elements allocated to a plurality of subspaces that include the subspace corresponding to the estimated position of the target and an adjacent subspace in a vicinity of the subspace.

2. The ranging sensor according to claim 1, wherein the TOF signal processing unit acquires, in each subspace of the subspace group set by the space control unit, information indicating reliability of the distance information corresponding to an estimated position of the target, which is estimated by the position estimation unit.

3. The ranging sensor according to claim 1, wherein the position estimation unit estimates a size of the target on a basis of the received light amount distribution of the plurality of light receiving elements that receive the reflected light beam from the target existing in the space of the subspace group set by the space control unit and acquires information indicating the size of the target at the estimated position obtained by the position estimation unit.

4. The ranging sensor according to claim 1, wherein the position estimation unit determines whether or not there are a plurality of targets in the space of the subspace group on a basis of the received light amount distribution of the plurality of light receiving elements that receive the reflected light beam from the target existing in the space of the subspace group set by the space control unit and acquires estimated position results of a plurality of high-ranking targets in descending order of a received light amount.

5. The ranging sensor according to claim 1, wherein the ranging sensor outputs at least part of information that is acquired to a register.

6. The ranging sensor according to claim 5, wherein, to a register address decided in order for a plurality of pieces of high-ranking distance information arranged in ascending order of distance among the distance information of the estimated position of the target in the subspace group set by the subspace control unit, information of the target, which includes the distance information that is acquired, is output.

7. The ranging sensor according to claim 5, wherein outputs of the distance information and the target information of the estimated position of the target in the subspace group set by the space control unit are output to a register output address decided in accordance with an input address of each register in the subspace group.

8. The ranging sensor according to claim 5, wherein the space control unit uses two-dimensional coordinates corresponding to the respective subspaces obtained by dividing the space to input, to the register, position information of the subspace group which is desired to be set, and sets the subspace group.

9. The ranging sensor according to claim 1, wherein, in each subspace of the subspace group set by the space control unit, the space control unit updates setting of the subspace group on a basis of output information of the ranging sensor for the target in the space of the subspace group.

10. A ranging sensor using a TOF method, which operates in cooperation with a camera module, measures time during which a beam radiated to a space is reflected by a target and returned, and generates distance information of the target for generating three-dimensional position information by combining the distance information with image information acquired by the camera module, the ranging sensor comprising:
- a light emitting unit that includes a plurality of light emitting elements arrayed in plane and radiates, toward subspaces obtained by dividing the space, light beams from each of the plurality of light emitting elements allocated to the respective subspaces by forming a beam by a light emitting lens system;
- a light receiving unit that includes a plurality of light receiving elements arrayed in plane, and receives reflected light beams from the respective subspaces by forming images of the reflected light beams on each of the plurality of light receiving elements, which are allocated, by a light receiving lens system;
- a space control unit that independently controls each element group including each of the plurality of light emitting elements and each of the plurality of light receiving elements, which are allocated to a common one of the subspaces, and that sets at least one subspace group that is designated in advance on a basis of the image information and obtained by bundling a plurality of adjacent subspaces;
- a position estimation unit that estimates, on a basis of received light amount distribution of the plurality of light receiving elements that receive a reflected light beam from the target existing in a space of each subspace in the subspace group set by the space control unit, a position of the target in the space of the subspace group; and
- a TOF signal processing unit that performs TOF signal processing in parallel with channels whose number is less than the number of the light emitting elements and acquires the distance information whose number is equal to or less than the number of channels, wherein
the ranging sensor outputs at least part of information that is acquired to a register,
the space control unit uses two-dimensional coordinates corresponding to the respective subspaces obtained by dividing the space to input, to the register, position information of the subspace group which is desired to be set, and sets the subspace group, and
the space control unit inputs, to the register, two-dimensional coordinates serving as a reference point of the subspace group, a subspace width in one axial direction and a subspace width in the other axial direction, for each of subspace groups that are desired to be set.

11. A ranging sensor using a TOF method, which operates in cooperation with a camera module, measures time during which a beam radiated to a space is reflected by a target and returned, and generates distance information of the target for generating three-dimensional position information by combining the distance information with image information acquired by the camera module, the ranging sensor comprising:
- a light emitting unit that includes a plurality of light emitting elements arrayed in plane and radiates, toward subspaces obtained by dividing the space, light beams from each of the plurality of light emitting elements allocated to the respective subspaces by forming a beam by a light emitting lens system;
- a light receiving unit that includes a plurality of light receiving elements arrayed in plane, and receives reflected light beams from the respective subspaces by forming images of the reflected light beams on each of the plurality of light receiving elements, which are allocated, by a light receiving lens system;
- a space control unit that independently controls each element group including each of the plurality of light emitting elements and each of the plurality of light receiving elements, which are allocated to a common one of the subspaces, and that sets at least one subspace group that is designated in advance on a basis of the image information and obtained by bundling a plurality of adjacent subspaces;
- a position estimation unit that estimates, on a basis of received light amount distribution of the plurality of light receiving elements that receive a reflected light beam from the target existing in a space of each subspace in the subspace group set by the space control unit, a position of the target in the space of the subspace group; and
- a TOF signal processing unit that performs TOF signal processing in parallel with channels whose number is less than the number of the light emitting elements and acquires the distance information whose number is equal to or less than the number of channels, wherein
the ranging sensor outputs at least part of information that is acquired to a register,
the space control unit uses two-dimensional coordinates corresponding to the respective subspaces obtained by dividing the space to input, to the register, position information of the subspace group which is desired to be set, and sets the subspace group, and
the space control unit inputs, to the register, two points of coordinates of an upper-right end and coordinates of a lower-left end or two points of coordinates of an upper-left end and coordinates of a lower-right end in the subspace group, for each of subspace groups that are desired to be set.

\* \* \* \* \*